(12) United States Patent
Li

(10) Patent No.: US 6,634,759 B1
(45) Date of Patent: Oct. 21, 2003

(54) COUPLING OF LIGHT FROM A LIGHT SOURCE TO A TARGET USING DUAL ELLIPSOIDAL REFLECTORS

(75) Inventor: Kenneth K. Li, Arcadia, CA (US)

(73) Assignee: Cogent Light Technologies, Inc., Santa Clarita, CA (US)

( * ) Notice: Subject to any disclaimer, the term of this patent is extended or adjusted under 35 U.S.C. 154(b) by 65 days.

(21) Appl. No.: 09/669,841

(22) Filed: Sep. 27, 2000

Related U.S. Application Data (60) Provisional application No. 60/192,321, filed on Mar. 27, 2000.

(51) Int. Cl.[7] .................................................. G02B 5/10
(52) U.S. Cl. ........................ 359/853; 359/858; 362/302; 362/346
(58) Field of Search ................................ 359/365, 850, 359/853, 857, 858, 868, 869; 362/297, 298, 302, 304, 346

(56) References Cited

U.S. PATENT DOCUMENTS

| | | | | |
|---|---|---|---|---|
| 4,357,075 A | * | 11/1982 | Hunter | 359/858 |
| 4,460,939 A | | 7/1984 | Murakami et al. | |
| 4,634,276 A | * | 1/1987 | Sharpe | 356/305 |
| 4,757,431 A | | 7/1988 | Cross et al. | 362/261 |
| 5,414,600 A | | 5/1995 | Strobl et al. | 362/32 |
| 5,430,634 A | | 7/1995 | Baker et al. | 362/32 |
| 5,515,242 A | | 5/1996 | Li | |
| 5,707,131 A | * | 1/1998 | Li | 362/32 |
| 6,144,412 A | * | 11/2000 | Hirano et al. | 348/441 |

FOREIGN PATENT DOCUMENTS

| | | |
|---|---|---|
| EP | 0 642 047 A1 | 9/1994 |
| WO | WO 98/39684 A1 | 9/1998 |

* cited by examiner

Primary Examiner—Mark A. Robinson
(74) Attorney, Agent, or Firm—Rothwell, Figg, Ernst & Manbeck, PC (57) ABSTRACT

A condensing and collecting optical system includes a first reflector and second reflector. The first and second reflectors and includes a portion of an ellipsoid of revolution having two focal point and an optical axis. A source of electromagnetic radiation is placed at one of the focal points of the first reflector to produce radiation that converges at the second focal point of the first reflector. The second focal points of the reflectors coincide. The second reflector is positioned to receive the radiation after it passes through a second focal point of the second reflector and focuses the radiation toward a target positioned at the first focal point of the second reflector. To achieve maximum illumination at the target, the first and second reflectors are substantially of the same size and shape and positioned in optical symmetry with respect to one another so that radiation reflected from a surface portion of the first ellipsoidal reflector is thereafter reflected from a corresponding surface portion of the second ellipsoidal reflector to achieve unit magnification between the source and its focused image. The ellipsoid reflectors may include non-ellipsoidal portions or may be approximated by spherical or toroidal reflectors.

40 Claims, 4 Drawing Sheets

COUPLING OF LIGHT FROM A LIGHT SOURCE TO A TARGET USING DUAL ELLIPSOIDAL REFLECTORS

RELATED APPLICATION

This application claims the benefit of U.S. Provisional Application No. 60/192,321 filed Mar. 27, 2000, the contents of which are hereby incorporated by reference.

FIELD OF THE INVENTION

This invention relates to systems for collecting and condensing electromagnetic radiation, particularly a system incorporating substantially ellipsoidal reflectors for collecting radiation emitted from a radiation source and focusing the collected radiation onto a target.

BACKGROUND OF THE INVENTION

An optical collecting and condensing system comprises various optical elements, such as reflectors and lenses, that receives light energy from a light source, such as a light bulb, and directs the light energy toward a target. In particular, the optical system collects and condenses electromagnetic radiation to couple the light energy to a standard waveguide, such as a single fiber or fiber bundle or to output the light energy to a homogenizer of a projector. The functional objective for the optical system is to maximize the brightness (i.e., the flux intensity) of the electromagnetic radiation at the target.

Figure 1:
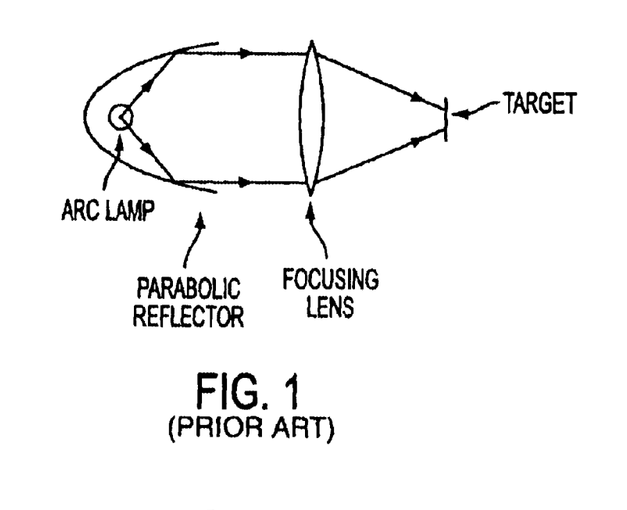
FIG. 1 is a schematic diagram, shown in cross-section, of a known on-axis condensing and collecting optical system that uses a paraboloid reflector and a focusing lens.

Optical systems for collecting and condensing light from a light source are generally classified as either "on-axis" or "off-axis." In the on-axis systems, the reflectors are positioned on the optical axis between light source, and the target. FIG. 1 illustrates a known on-axis optical system that uses a paraboloid reflector with an imaging lens. The paraboloid reflector has the feature that light energy emanating from a focus is substantially collimated to travel parallel to the optical axis. The optical system of FIG. 1 uses this feature of the paraboloid reflector by positioning the light source at the focus in order to collimate the light from the light source. A condensing lens positioned in the optical stream receives the substantially collimated light energy and redirects the light energy toward the target. In this way, the light energy is collected and condensed at the target. The use of the paraboloid reflector further allows the use of various types of optical filters to improve the performance and durability of the optical system. However, the divergence of the light varies continuously along the reflector, with rays traveling near the optical axis having the greatest divergence. As a result, the magnification of the system varies along the different paths taken by the light emitted from the light source, causing degradation of the brightness of the system. Moreover, the focusing lens produces a distorted image even under perfect conditions and under actual operation typically produces badly aberrated images which effectively increase the image size and reduce flux intensity at the target.

Figure 2:
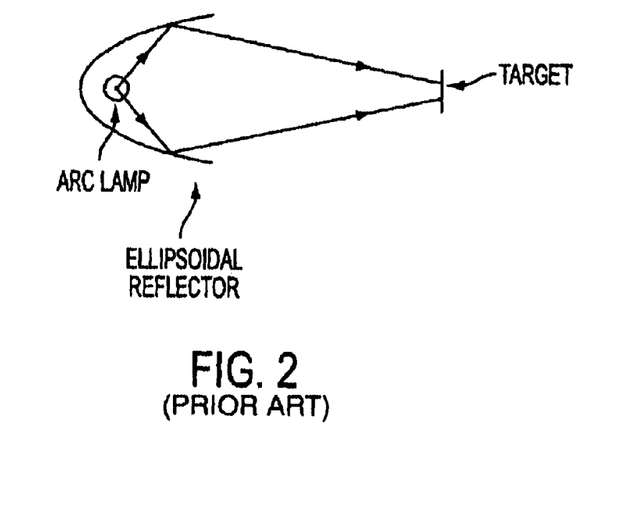
FIG. 2 is a schematic diagram, shown in cross-section, of a known on-axis condensing and collecting optical system that uses an ellipsoidal reflector.

FIG. 2 illustrates another known on-axis optical system. This system uses an ellipsoidal reflector, which has the feature that all light emanating from one focal point is directed to a second focal point. The optical system of FIG. 2 uses an ellipsoidal reflector with a light source placed at the first focus and a target placed at the second focus. As in the previous system, the on-axis ellipsoidal system suffers from brightness degradation caused because the divergence of the light varies continuously along the reflector, with rays traveling near the optical axis having the greatest divergence.

Overall, on-axis systems generally suffer from the basic limitations of losing brightness in the coupling, thus degrading the overall efficiency of the optical illumination and projection system. In particular, the divergence of the reflected beam in known on-axis systems is undesirably dependent on the angle of emission from the radiation source. Additionally, the outputs of the on-axis system are substantially circular and symmetric and, therefore, may not be suitable for non-circular targets, such as a rectangular homogenizer for use in projection.

Figures 3, 4:
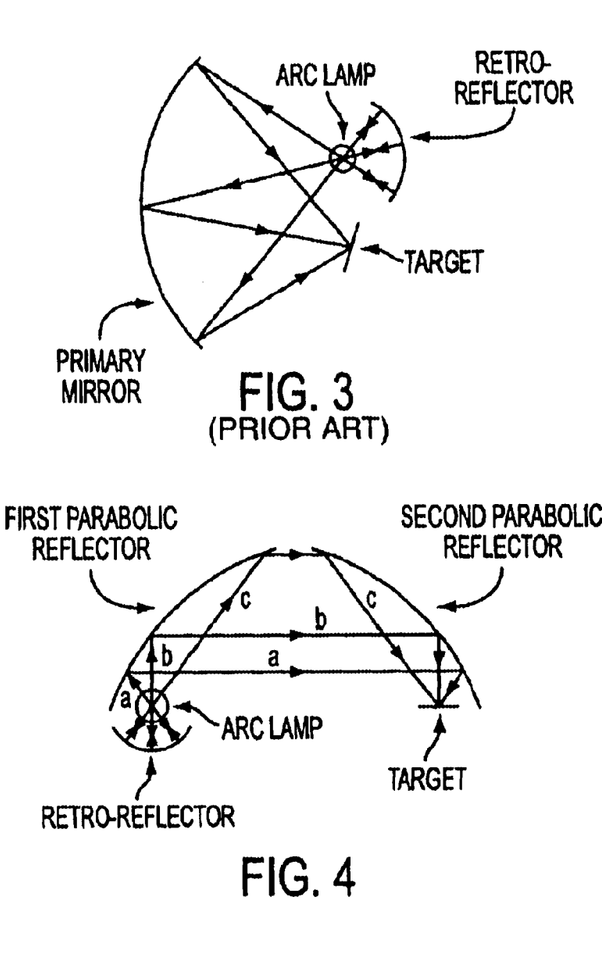
FIG. 3 is a schematic diagram, shown in cross-section, of a known off-axis condensing and collecting optical system.
FIG. 4 is a schematic diagram, shown in cross-section, of a known on-axis condensing and collecting optical system that uses two paraboloid reflectors.

In off-axis optical collecting systems, the reflectors are positioned off the optical axis between the light source and the target. For example, FIG. 3 illustrates an optical system in which the light source is positioned at a focal point of a retro-reflector and the target is positioned on a focal point of a primary reflector, but the reflectors are positioned off the optical axis between the light source and the target. In the illustrated optical system, light energy from the light source reflects from the retro-reflector and travels to the primary reflector. The optical energy then reflects from the primary reflector and converges at the target.

With the off axis system of FIG. 3, the magnification is very close to 1-to-1 for all angles of light when the numerical aperture of the system is small. When the system uses mirrors having higher numerical apertures (e.g., attempts to collect more light energy from the same light source) the larger angle light rays are reflected with high divergence angles, causing the magnification to deviate from 1-to-1. Again, the magnification reduces the brightness at the target and overall decreases the performance of the optical system. The amount of deviation in the magnification depends on the size of the mirror, the radius of curvatures, and the separation of the arc lamp and the target. Accordingly, the off-axis configuration of FIG. 3 is more suitable for applications that use smaller numerical apertures.

Different off-axis optical systems are also known. For example, U.S. Pat. No. 4,757,431 ("the '431 patent") provides a condensing and collecting system employing an off-axis spherical concave reflector which enhances the maximum flux intensity illuminating a small target and the amount of collectable flux density by the small target. Enhancements to the optical system of the '431 patent are provided by U.S. Pat. No. 5,414,600 ("the '600 patent"), in which the off-axis concave reflector is an ellipsoid, and by U.S. Pat. No. 5,430,634 ("the '634 patent"), in which the off-axis concave reflector is a toroid. Although the toroidal system described in the '634 patent corrects for astigmatism, and the ellipsoidal system of the '600 patent provides a more exact coupling than the spherical reflector of the '431 patent, each of these systems requires the application of an optical coating onto a highly curved reflective surface, which is relatively expensive and difficult to apply in a uniform thickness.

Overall, the known off-axis optical systems provide a generally near 1-to-1 (i.e., magnification free) image of the light source at the target and conserve brightness. However, in the known off-axis systems, the magnification deviates from 1-to-1 as the amount of light collected is increased by increasing the collection angle of the reflector. Thus, as a greater portion of light energy from a light source is collected to increase optical intensity, the overall performance of the optical system degrades.

To address problems in the known optical collection and condensing systems, U.S. patent application Ser. No. 09/604,921 provides an on-axis, dual-paraboloid reflector system that is advantageous in many respects to other known systems, including the achievement of near 1-to-1 magnification for small-sized light sources. This optical collection and condensing system, as illustrated in FIG. 4, uses two generally symmetric paraboloid reflectors that are positioned so that light reflected from the first reflector is received in a corresponding section of the second reflector. In particular, light emitted from the light source is collected by the first parabolic reflector and collimated along the optical axis toward the second reflector. The second receives the collimated beam of light and focuses this light at the target positioned at the focal point.

To facilitate the description of this optical system, FIG. 4 includes the light paths for three different rays (a, b, and c) emitted from the light source. Ray a travels a relatively small distance before intersecting the first parabolic reflector, but the divergence of ray a at the first parabolic reflectors is relatively large. In contrast, ray c travels further between the light source and the first parabolic reflector but has a smaller relative divergence at the first reflector. Ray b, positioned between rays a and c, travels an intermediate distance before intersecting the first parabolic reflector and has an intermediate divergence. In this optical system, due to the symmetry of the two parabolic reflectors, the rays a, b, and c are reflected at corresponding positions in the second parabolic reflector such that the distance for each ray between the second parabolic reflector and the target is the same as the distance between the light source and the first parabolic reflector. In this way, the second reflector compensates for the divergence. Consequently, the optical system collects and condenses light energy from the light source with a near 1-to-1 magnification and preserves the brightness of the light source.

The optical system of FIG. 4 may further employ a retro-reflector in conjunction with the first paraboloid reflector to capture radiation emitted by the source in a direction away from the first paraboloid reflector and reflect the captured radiation back through the source. In particular, the retro-reflector has a generally spherical shape with a focus located substantially near the light source (i.e., at the focal point of the first paraboloid reflector) toward the first paraboloid reflector to thereby increase the intensity of the collimated rays reflected therefrom.

One shortcoming in the above described on-axis, dual-paraboloid optical system arises because the light source is very close to the apex side of the reflector. As a result, the system produces a large angle of divergence near the light source (i.e., along the paths similar to ray a). In particular, a large angle of divergence causes light energy traveling along a path similar to ray a to compass a relatively larger area on the second parabolic reflector, thus producing unwanted aberrations and a loss of brightness.

In view of these shortcomings in known optical collection and condensing systems, there remains a present need for an improved method and system of coupling light from a small source to illumination and projection systems.

SUMMARY OF THE INVENTION

In response to the above-identified needs, the present invention provides an improved optical collection and condensing system. The improved system for collecting and condensing electromagnetic radiation employs opposing reflectors to achieve unit magnification, or near unit magnification, between a source image and a focused image at a target, thereby producing maximum focused intensity at the target. In particular, the present invention is directed to an optical device for collecting electromagnetic radiation from a source of electromagnetic radiation and focusing the collected radiation onto a target to be illuminated with at least a portion of the electromagnetic radiation emitted by the source. The device includes first and second reflectors, where each reflector generally comprises at least a portion of an ellipsoid of revolution and has an optical axis and two focal points on the optical axis. A light source located proximate the one of focal points of the first reflector produces rays of radiation that converge at the second focal point of the first reflector. The second reflector is positioned and oriented with respect to the first reflector so that the rays of radiation reflected from the first reflector converge at a one focal point of the second reflector. The rays of radiation then continue until reflected by the second reflector and focused toward a target located proximate a second focal point of the second reflector. The first reflector and the second reflector have substantially the same size and shape and may be oriented optically about symmetrically with respect to each other so that each ray of radiation reflected by a surface portion of the first reflector is reflected by a corresponding surface portion of the second reflector toward the target to achieve a unit magnification.

A retro-reflector may be used in conjunction with the first reflector to capture radiation emitted by the source in a direction away from the first reflector and to reflect the captured radiation back through the source (i.e., through the first focal point of the first reflector) toward the first reflector to thereby increase the intensity of the rays reflected therefrom.

The shape of the first and second reflectors may deviate from an ellipsoid as needed by the system. Similarly, the first and second reflectors may have a toroidal or spherical shape that approximate an ellipsoid.

DESCRIPTION OF THE DRAWING

Embodiments of the present invention will be described with reference to the attached drawings in which like components or features in the various figures are represented by like reference numbers.

DETAILED DESCRIPTION OF EXEMPLARY EMBODIMENTS

With reference to the figures, exemplary embodiments of the invention are now described. These embodiments illustrate principles of the invention and should not be construed as limiting the scope of the invention.

Figure 5:
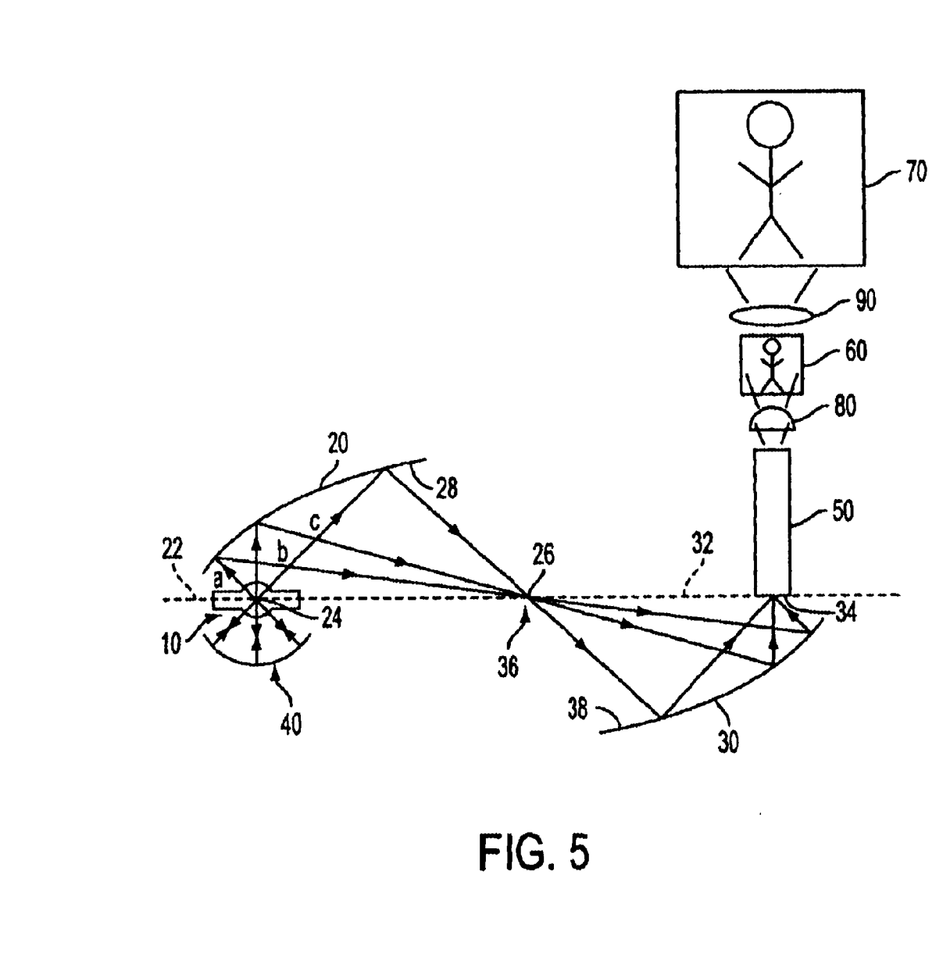
FIG. 5 is a schematic diagram, shown in cross-section, of an off-axis condensing and collecting optical system using two ellipsoidal reflectors in accordance with one embodiment of the present invention.
Figure 6:
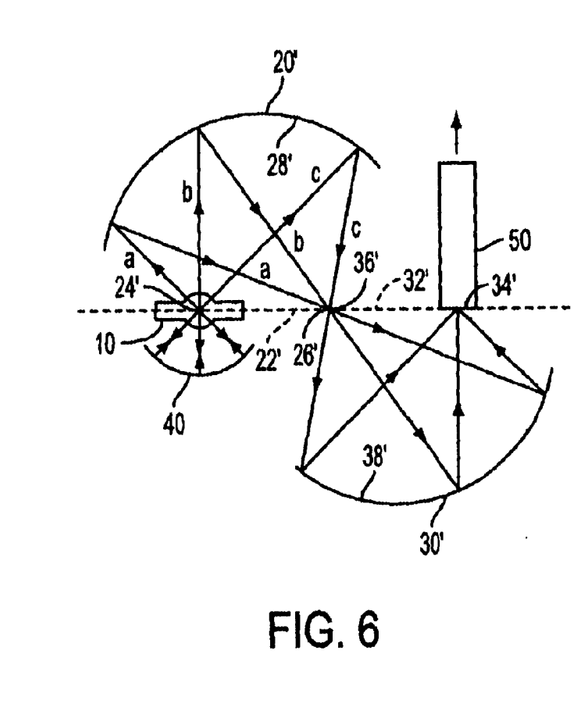
FIG. 6 is a schematic diagram, shown in cross-section, of a condensing and collecting optical system using two reflectors of greater eccentricity in accordance with an alternative embodiment of the present invention.

Referring to FIGS. 5–6 as showing representative preferred embodiments of the present invention, the invention has associated therewith the following four main components:

1. Electromagnetic Source

The electromagnetic source 10 is preferably a light source having an envelope 12. Most preferably, the source 10 comprises an arc lamp such as a xenon lamp, a metal-halide lamp, a HID lamp, or a mercury lamp. For certain applications, filament lamps, e.g., halogen lamps, can be used, provided the system is modified to accommodate the non-opaque filaments of the lamp, as will be described in more detail below. However, any source of electromagnetic radiation which is of similar size to or smaller than the target may be used (e.g., fiber, filament lamp, gas discharge lamp, laser, LED, semiconductor, etc.).

The size of the electromagnetic source here is better defined by the 1/e intensity of the intensity contour map which characterizes the brightness (flux density over angular extent) of the source. Brightness is related to the size of the arc gap and determines the theoretical limit of coupling efficiency. For the specific case of an arc lamp, the contour approximates axial symmetry and is a complex function of electrical rating, electrode design and composition, gas pressure, arc gap size, and gas composition. For the specific case of an arc lamp having ar aspherical curved envelope, the effective relative position and intensity distribution of the source imaged by the reflector undergoes aberration. This is caused by the shape of the envelope which essentially functions as a lens and requires a compensating optical element. Optical compensation can be achieved either by modifying the design of the reflector to compensate for the astigmatism caused by the envelope or by inserting a correcting optic between the source and the target. Additionally, optical coatings can be applied to the envelope to minimize Fresnel reflections and thereby maximize collectable radiation at the target or to control and/or filter the radiation flux.

2. First Ellipsoidal Reflector

The first ellipsoidal reflector 20 preferably comprises a portion of an ellipsoid of revolution having an optical axis 22 and focal points 24 and 26. The first ellipsoidal reflector 20 preferably has a reflective coating 28 (e.g., aluminum or silver) and the surface is highly polished. For certain applications, the first ellipsoidal reflector 20 can be made from glass coated with a wavelength-selective multi-layer dielectric coating. For example, the coating 28 may be a cold coating with high reflectivity only in the visible wavelengths for use in visual light applications. With the source 10 placed at the first focal point 24 of the first ellipsoidal reflector, electromagnetic radiation that contacts the reflector 20 is reflected as a beam of energy that converges the second focal point 26 of the reflector 20. Where the source 10 is an arc lamp, the arc gap is preferably small compared to the focal length of the first ellipsoidal reflector 20.

3. Second Ellipsoidal Reflector

The second ellipsoidal reflector 30 preferably comprises a portion of an ellipsoid of revolution having an optical axis 32 and focal points 34 and 36. The second reflector 30 may also have a coating 38, as described above to selectively reflect light energy. The second ellipsoidal reflector 30 may differ from first reflector 20, but is preferably substantially the same size and substantially the same shape as the first ellipsoidal reflector 20.

The second ellipsoidal reflector 30 is positioned and oriented so that the electromagnetic radiation reflected by the first ellipsoidal reflector 20 converges at the second focal point 36 of the second ellipsoidal reflector 30. The radiation continues until impinging the surface of the second ellipsoidal reflector 30 and is thereafter focused toward the first focal point 34 of the second ellipsoidal reflector 30. In order to achieve unit magnification between the first ellipsoidal reflector 20 and the second ellipsoidal reflector 30 (i.e., a focused image that is substantially the same size as the source), it is important that each ray of electromagnetic radiation reflected and focused by a surface portion of the first ellipsoidal reflector 20 be reflected and focused by a corresponding surface portion of the second ellipsoidal reflector 30 in order to achieve a focus at the first focal point 34 that is of the maximum possible brightness. In the context of the present disclosure, orienting and positioning the first ellipsoidal reflector 20 and the second ellipsoidal reflector 30 with respect to each other so that each ray of electromagnetic radiation collimated by a surface portion of the first ellipsoidal reflector 20 is focused by a corresponding surface portion of the second ellipsoidal reflector 30 will be referred to as positioning the reflectors in "optical symmetry" with respect to each other.

4. Target

The target 50 is a small object requiring illumination with the highest intensity possible. In a preferred embodiment, the target 50 is a waveguide, such as a single core optic fiber, a fused bundle of optic fibers, a fiber bundle, as illustrated in FIG. 6. An input end of the target (e.g., a proximal end of the optic fiber) is positioned at the first focal point 34 of the second ellipsoidal reflector 30 to receive the focused rays of electromagnetic radiation reflected by the second ellipsoidal reflector 30.

When the optical collection and condensing systems of the present invention are applied to applications for illuminations or projection of an image, there is a need to homogenize the output intensity profile at the target such that the output is more uniform. For example, for illumination during a medical procedure such as endoscopy, it is desirable to have uniform illumination so that the doctor can observe areas in the center and the periphery of the illumination with equal clarity. In the case of illuminations using optical fibers, the uniform intensity allows higher power to be coupled to a particular fiber optic configuration without being damaged by hot spots. In the case of projections, the uniform intensity will be needed to produce a uniform intensity profile at the screen. In particular, it is desirable for visual aesthetics that the center and the periphery of the displayed image have equal levels of illumination.

Figure 7A:
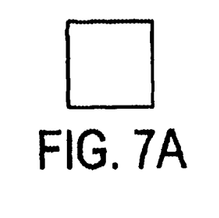
FIGS. 7a–7j are schematic views of a plurality of waveguide targets in cross-sections which may be employed in embodiments of the present invention.
Figure 7B:
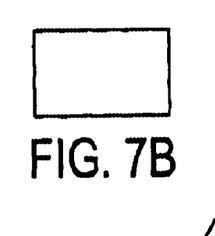
Figure 7C:
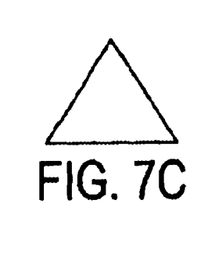
Figure 7D:
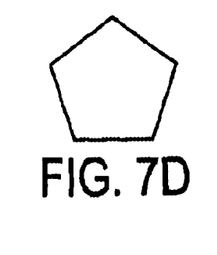
Figure 7E:
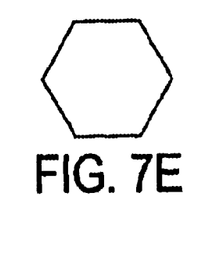
Figure 7F:
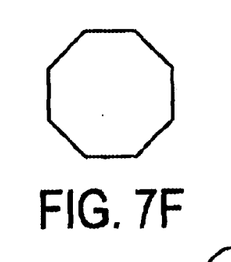
Figure 7G:
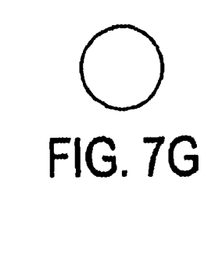
Figure 7H:
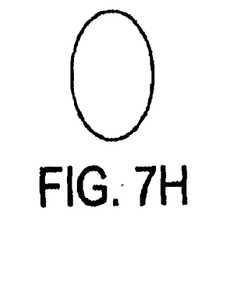

Accordingly, the target may be a homogenizer, as illustrated in FIG. 5, that adjusts the output intensity profile. The waveguide may be polygonal (square, rectangle, triangle, etc.) in cross-section as shown in FIGS. 7a–7f or rounded (circular, elliptical, etc.) in cross-section as shown in FIGS. 7g–7h.

Figures 7I, 7J:
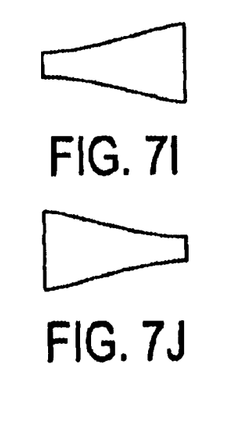

Depending on the output requirement in terms of numerical aperture and size, the homogenizer can be tapered from smaller to larger sizes or vice versa. Thus, the target 50 can be an increasing taper waveguide as shown in FIG. 7i, or a decreasing taper waveguide as shown in FIG. 7j. In this way, the homogenizer allows changes in the shape of the output of the illumination. For example in projection displays in which an image source 60 is placed in the output stream of the target 50 through a condenser lens 80 and a projection lens 90 to create a projected image 70, the ideal output of the homogenizer will be rectangular with a ratio of width-to-height of 4-to-3 or 16-to-9, or other ratios, depending on the format of the display. Nevertheless, the angle of the illuminating radiation in both directions should be similar and such that a circular projection lens 90 can be used with the optical system efficiently.

While the target and the source are intimately associated with the collecting and condensing system of the present invention, according to its broader aspects, the invention relates to the use of two reflectors of substantially the same size and shape arranged so as to share a single focal point (i.e., the second focal point 26 of the first reflector 20 and the second focal point 36 of the second reflector 30 are located substantially identical positions).

Continuing with the description of the collecting and condensing system, in the arrangements shown in FIGS. 5–6, the first ellipsoidal reflector 20 and the second ellipsoidal reflector 30 are positioned in an opposed, facing relation with respect to each other so as to be concave toward each other. Optical symmetry is achieved in the arrangements of FIGS. 5–6 by arranging the first ellipsoidal reflector 20 and the second ellipsoidal reflector 30 so that their respective optical axes 22 and 32 are collinear and so that the reflective surface of the first ellipsoidal reflector 30 is an opposed, facing relation with the corresponding reflecting surface of the second ellipsoidal reflector 30 achieving a unit magnification.

In FIGS. 5–6, three rays a, b, and c are drawn to illustrate the function of the reflectors in view of different possible paths for the electromagnetic radiation produced by the source 10. In FIGS. 5–6, the rays a, b, and c are in substantially the same positions as in FIG. 4 in order to illustrate the effectiveness of the present optical system in reducing aberration. Each of the rays a, b, and c emitted from the light source 10 impinges the first ellipsoidal reflector 20 at a different point, each point having a different distance from source 10. But each of the rays a, b, and c is also focused onto the target 50 from a corresponding position of the second ellipsoidal reflector 30, thus produces a 1:1 magnification for the three rays.

As before, ray a has the shortest distance from the source 10 and the first ellipsoidal reflector 20 and consequentially produces a larger divergence in comparison to rays b and c. With the optical system of the present invention, radiation from the light source is focused from the first focal point 24 of the first reflector 20 to the second point 26. As a result, the distances traveled by the radiation from the source 10, even those emitted at high angles such as ray a, is relatively larger than the corresponding distance in the system of FIG. 4 that uses paraboloid reflectors. The larger distance reduces the amount of aberration because the distances of rays a, b, and c are now relatively more uniform.

To reduce aberration even further, FIG. 6 shows another embodiment of the present invention in which the first and second ellipsoidal reflectors 201 and 30' have greater eccentricity (i.e., the first and second ellipsoidal reflectors are more circular). As a result of the greater curvature of the first and second ellipsoidal reflectors 201 and 30' in this embodiment, the distance between the first focus 24' of the first ellipsoidal reflector 20' and the first focus 34' of the second ellipsoidal reflector 30' is reduced. At the same time, the greater curvature of the ellipsoidal reflectors 20' and 30' increases the distance between the first ellipsoidal reflector 20' and its first focus 24' along ray a. Likewise, the corresponding distance between the second ellipsoidal reflector 30' and its first focus 34' along ray a is increased. As a result, the distances travelled between the radiation source 10' and the first reflector 20' (as well as the total distance between the source 10' and the target 50') for the rays a, b, and c in FIG. 6 are relatively more uniform in comparison to the embodiment of FIG. 5. This feature allows the system to produce less aberration between the light source and the target, even with electricalmagnetic energy traveling near the optical axis 22', such as energy traveling paths similar to ray a.

By comparing the path of the same ray c in FIGS. 5 and 6, it can be seen that the embodiment of FIG. 6 uses reflectors 20' and 30' covering a greater portion of an ellipsoid in order to collect the same angle of output radiation from the source 10. However, it can be seen that reflectors 20' and 30' in FIG. 6 have approximately the same diameter as reflectors 20 and 30 in FIG. 5.

As shown in FIGS. 5 and 6, the collecting and condensing system of the present invention may incorporate the use of a retro-reflector 40, which, in the illustrated embodiment, is a spherical retro-reflector. The retro-reflector 40 is positioned to capture electromagnetic radiation emitted by the source 10 that would not otherwise impinge on the first ellipsoidal reflector 20. More particularly, the spherical retro-reflector 40 is constructed and arranged so that radiation emitted by the source 10 in a direction away from the first ellipsoidal reflector 20 is reflected by the retro-reflector 40 back through the first focal point 24 of the first ellipsoidal reflector 20 and thereafter toward the first ellipsoidal reflector 20. This additional radiation reflected by the first ellipsoidal reflector 20 is added to the radiation that impinges the first ellipsoidal reflector 20 directly from the source 10 to thereby increase the intensity of the radiation reflected toward the second ellipsoidal reflector 30. Consequently, the intensity of the radiation at the first focal point 34 of the second ellipsoidal reflector 30 is also increased.

If a filament lamp is employed as the source 10, the retro-reflector cannot be oriented so that it focuses radiation back through the first focal point 24 of the first ellipsoidal reflector 20, because the retro-reflected radiation would be blocked by the opaque filaments located at the first focal point 24. In this case, the position of the retro-reflector 40 should be adjusted so that the retro-reflected radiation passes near but not precisely through the first focal point 24.

It should be appreciated that several different retro-reflectors 40 are known and may be employed in the present invention. For example, as an alternative to a spherical retro-reflector 40, the retro-reflecting function can be performed by a two-dimensional corner cube array (not shown) with unit elements sized on the order of the arc size of the source 10 or smaller. Employing a two-dimensional corner cube array eliminates the need for precisely positioning a retro-reflector and will produce a tighter focus at the arc of the source 10.

It should be further appreciated that, although the above embodiments describe configurations with first and second reflectors having an ellipsoidal shape, it is known and anticipated by the present invention that first and second reflector 20 and 30 may be approximated using shapes that are slightly different from an ideal geometric ellipsoid shape. For example, the first and second reflector 20 and 30 may have altered ellipsoidal shapes to compensate of various parameters, such as bulb envelops, filters, etc. In this case, the deviation in the shape of the generally ellipsoidal reflectors 20 and 30 can be small and the final output may be slightly different from the optimum. Deviations in the shape of the reflectors can also be introduced to reduce cost of the reflectors 20 and 30, or increase performance for particular lamp types and arc shapes. For example, it is known and anticipated by the present invention that ellipsoidal reflectors 20 and 30 can be approximated by toroidal reflectors (having two perpendicular and unequal radii of curvature) or spherical reflectors, which can be manufactured at a lower relative cost. If non-ellipsoidal reflectors are used, the output coupling may not be optimum, but the reduced expense for the first and second reflectors 20 and 30 may be sufficient to justify the loss through the inefficient coupling.

Several examples of the present invention are now provided. These examples are meant to illustrate some possible implementations of the present invention but are not intended to limit the scope of the present invention.

EXAMPLES

A first pair of exemplary optical systems in accordance with the present invention uses a low wattage lamp, in the order of 100 Watts, as the lights source. In a reflection system in accordance with the embodiment of FIG. 5, each of the first and second reflectors has a diameter of 2.5 inches, and the separation between the source and target (i.e., the distance between the foci) is about 5 inches. In contrast, a low wattage reflection system of greater eccentricity in accordance with the embodiment illustrated in FIG. 6 uses first and second reflectors of similar size, each having diameter of approximately 2.5 inches, but has a distance between the source and target of approximately 2 inches.

In higher wattage applications, the optical system is relatively larger to provide desirable collection of the higher electromagnetic energy levels and to accommodate the potentially larger lamps. For example, when using a high wattage lamp, on the order of 5,000 Watts with the configuration of FIG. 5, each of the primary reflectors has a diameter of 20 inches, and the seperation between the source and the target is about 40 inches. As before, the embodiment of FIG. 6 uses primary reflectors of similar size but results in a reduced distance between the source and target. For instance, an exemplary high wattage optical system in accordance with embodiment of the FIG. 6, also uses first and second reflectors with a diameter of approximately 20 inches but has a distance between of the source and target of 16 inches.

Conclusion

The invention, having been described, it will be apparent to those skilled in the art that the same may be varied in many ways without departing from the spirit and scope of the invention. Any and all such modifications are intended to be included within the scope of the following claims.

What is claimed:

1. An optical device comprising:
a single, non-cascaded source of electromagnetic radiation;
a waveguide to be illuminated with at least a portion of the electromagnetic radiation emitted by said source;
a first reflector comprising less than a complete concave surface of revolution having an optical axis and a first and a second focal point on said optical axis, said source being located proximate to said first focal point of said first reflector to produce rays of radiation that reflect from said first reflector and substantially converge at said second focal point; and
a second reflector comprising less than a complete concave surface of revolution having an optical axis and a first and a second focal point on said optical axis of said second reflector, said waveguide being located proximate to said first focal point of said second reflector to receive rays of radiation that pass through said second focal point of said second reflector and are reflected by said second reflector to substantially converge at said first focal point of said second reflector, said second reflector being positioned and oriented with respect to said first reflector such that said second focal point of said first reflector and said second focal point of said second reflector are positioned substantially proximate and said optical axis of said first reflector and said optical axis of said second reflector are substantially collinear, wherein said single source of electromagnetic radiation is the only source of radiation in said device.

2. The collecting and condensing system of claim 1 wherein said first reflector has a coating that reflects only a pre-specified portion of the electromagnetic radiation spectrum.

3. The optical device of claim 2, wherein said coating only reflects either visible light radiation, a pre-specified broadband of radiation, or a specific color of radiation.

4. The optical device of claim 1, wherein each of said first and said second reflectors comprises at least a portion of a substantial ellipsoid of revolution.

5. The optical device of claim 1, wherein a portion of the electromagnetic radiation emitted by said source of electromagnetic radiation impinges directly on said first reflector and a portion of the electromagnetic radiation does not impinge directly on said first reflector and wherein said device further comprise an additional reflector constructed and arranged to reflect at least part of the portion of the electromagnetic radiation that does not impinge directly on said first reflector toward said first reflector through the first focal point of said first reflector to increase the flux intensity of the converging rays.

6. The optical device of claim 5, wherein said additional reflector comprises a spherical retro-reflector disposed on a side of said source opposite said first reflector to reflect electromagnetic radiation emitted from said source in a direction away from said first reflector toward said first reflector through the first focal point of said first reflector.

7. The optical device of claim 1, wherein said optical axes of said first and second reflectors substantially coincide with one another and wherein said first and second reflectors are arranged in an opposed, facing relation with respect to each other.

8. The optical device of claim 1, wherein said source comprises a light-emitting arc lamp.

9. The optical device of claim 8, wherein said arc lamp comprises a lamp selected from the group comprising a xenon lamp, a metal halide lamp, an HID lamp, or a mercury lamp.

10. The optical device of claim 1, wherein said source comprises a filament lamp.

11. The optical device of claim 1, wherein said waveguide is selected from the group consisting of a single core optic fiber, a fiber bundle, a fused fiber bundle, a polygonal rod, a hollow reflective light pipe, or a homogenizer.

12. The optical device of claim 11 wherein said waveguide is selected from the group consisting of circular cross-section waveguides, polygonal cross-section waveguides, tapered waveguides and combinations thereof.

13. The optical device of claim 12 wherein said waveguide is rectangular to produce an radiation output having a width-to-height ratio of either 4-to-3 or 16-to-9.

14. The optical device of claim 1 further comprising an image source illuminated by the radiation collected and condensed at said waveguide, wherein said image source contains a stored image and said stored image is projected by the radiation.

15. The optical device of claim 1 further comprising a fiber optic, the fiber optic being illuminated by the radiation collected and condensed at said waveguide, the fiber optic releasing the collected and condensed radiation to provide for illumination at a desired location.

16. The optical device of claim 1 wherein the first and the second reflectors each have diameter that is greater than a distance between the source and the waveguide.

17. The optical device of claim 1 wherein said concave surface of said first reflector is configured such that unit magnification of said source does not occur at said second focal point of said first reflector.

18. An optical device comprising:
a single, non-cascaded source of electromagnetic radiation;
a target to be illuminated with at least a portion of the electromagnetic radiation emitted by said source;
a first reflector comprising a portion of a concave surface of revolution having an optical axis and a first and a second focal point on said optical axis, said source being located proximate to said first focal point of said first reflector to produce rays of radiation that reflect from said first reflector and substantially converge at said second focal point; and
a second reflector comprising a portion of a concave surface of revolution having an optical axis and a first and a second focal point on said optical axis of said second reflector, said target being located proximate to said first focal point of said second reflector to receive rays of radiation that pass through said second focal point of said second reflector and are reflected by said second reflector to substantially converge at said first focal point of said second reflector, said second reflector being positioned and oriented with respect to said first reflector such that said second focal point of said first reflector and said second focal point of said second reflector are positioned substantially proximate and said optical axis of said first reflector and said optical axis of said second reflector are substantially collinear,
wherein said single source of electromagnetic radiation is the only source of radiation in said device, and
wherein the first reflector and the second reflector are about the same size and shape and have a corresponding size and optical orientation with respect to each other so that substantially each ray of radiation reflected by a surface portion of said first reflector is reflected by a corresponding surface portion of said second reflector toward said target so as to achieve substantially unit magnification between the source and the target.

19. An optical device comprising:
a source of electromagnetic radiation;
a target to be illuminated with at least a portion of the electromagnetic radiation emitted by said source;
a first reflector having an optical axis and a first and a second focal point on said optical axis, said source being located proximate to said first focal point of said first reflector to produce rays of radiation that reflect from said first reflector and substantially converge at said second focal point; and
a second reflector having an optical axis and a first and a second focal point on said optical axis of said second reflector, said target being located proximate to said first focal point of said second reflector to receive rays of radiation that pass through said second focal point of said second reflector and are reflected by said second reflector to substantially converge at said first focal point of said second reflector, said second reflector being positioned and oriented with respect to said first reflector such that said second focal point of said first reflector and said second focal point of said second reflector are positioned substantially proximate and said optical axis of said first reflector and said optical axis of said second reflector are substantially collinear;
wherein each of said first and said second reflectors comprises at least a portion of a substantial ellipsoid of revolution;
wherein each of said first and said second reflectors further comprises a non-ellipsoidal section.

20. An optical device comprising:
a single, non-cascaded source of electromagnetic radiation;
a target to be illuminated with at least a portion of the electromagnetic radiation emitted by said source;
a first reflector comprising a portion of a concave surface of revolution having an optical axis and a first and a second focal point on said optical axis, said source being located proximate to said first focal point of said first reflector to produce rays of radiation that reflect from said first reflector and substantially converge at said second focal point; and
a second reflector comprising a portion of a concave surface of revolution having an optical axis and a first and a second focal point on said optical axis of said second reflector, said target being located proximate to said first focal point of said second reflector to receive rays of radiation that pass through said second focal point of said second reflector and are reflected by said second reflector to substantially converge at said first focal point of said second reflector, said second reflector being positioned and oriented with respect to said first reflector such that said second focal point of said first reflector and said second focal point of said second reflector are positioned substantially proximate and said optical axis of said first reflector and said optical axis of said second reflector are substantially collinear,
wherein said single source of electromagnetic radiation is the only source of radiation in said device, and
wherein each of said first and said second reflectors comprises at least a portion of a substantial toroid of revolution.

21. An optical device comprising:
a source of electromagnetic radiation;
a target to be illuminated with at least a portion of the electromagnetic radiation emitted by said source;
a first reflector having an optical axis and a first and a second focal point on said optical axis, said source being located proximate to said first focal point of said first reflector to produce rays of radiation that reflect from said first reflector and substantially converge at said second focal point; and
a second reflector having an optical axis and a first and a second focal point on said optical axis of said second reflector, said target being located proximate to said first focal point of said second reflector to receive rays of radiation that pass through said second focal point of said second reflector and are reflected by said second reflector to substantially converge at said first focal point of said second reflector, said second reflector being positioned and oriented with respect to said first reflector such that said second focal point of said first reflector and said second focal point of said second reflector are positioned substantially proximate and said optical axis of said first reflector and said optical axis of said second reflector are substantially collinear;

wherein each of said first and said second reflectors comprises at least a portion of a substantial sphere of revolution.

22. An optical device for collecting electromagnetic radiation emitted by a single, non-cascaded source of electromagnetic radiation and focusing the collected radiation onto a waveguide, said device comprising:

a first reflector comprising less than a complete revolution of a concave curve, said first reflector having an optical axis and at least two focal points on said optical axis, said first reflector producing rays of radiation reflected from said first reflector that converge at a second focal point of said first reflector when a source of electromagnetic radiation is located at a first focal point of said first reflector; and a second reflector comprising less than a complete revolution of a concave curve, said second reflector having an optical axis arid at least two focal points on said optical axis, said second reflector being positioned and oriented with respect to said first reflector so that the optical axis of the first reflector and the optical axis of the second reflector are substantially collinear, said second reflector being positioned and oriented with respect to said first reflector so that the second focal point of the first reflector and a first focal point of the second reflector are positioned substantially proximate, and the converging rays of radiation reflected from said first reflector passing through the second focal point of the first reflector and being redirected by said second reflector toward the waveguide positioned proximate the second focal point of said second reflector, wherein said single source of electromagnetic radiation is the only source of radiation in said device.

23. The optical device of claim 22, further comprising an additional reflector constructed and arranged to reflect at least part of a portion of electromagnetic radiation emitted by the source that does not impinge directly on said first reflector toward said first reflector through the first focal point of said first reflector to increase the flux intensity of the converging rays.

24. The optical device of claim 23, wherein said additional reflector comprise a spherical retro-reflector disposed on a side of the source opposite said first reflector to reflect electromagnetic radiation emitted from the source in a direction away from said first reflector toward said first reflector through the first focal point of said first reflector.

25. The optical device of claim 22, wherein said optical axes of said first and second reflectors substantially coincide with one another and wherein said first and second reflectors are arranged in an opposed, facing relation with respect to each other.

26. The optical device of claim 22, wherein each of said first and said second reflectors comprises at least a portion of a substantial ellipsoid of revolution.

27. The optical device of claim 22 wherein the first and the second reflectors each have diameter that is greater than a distance between the source and the waveguide.

28. The optical device of claim 22 wherein said concave surface of said first reflector is configured such that unit magnification of said source does not occur at said second focal point of said first reflector.

29. The optical device of claim 22, wherein said waveguide is selected from the group consisting of a single core optic fiber, a fiber bundle, a fused fiber bundle, a polygonal rod, a hollow reflective light pipe, or a homogenizer.

30. The optical device of claim 29 wherein said waveguide is rectangular to produce an radiation output having a width-to-height ratio of either 4-to-3 or 16-to-9.

31. The optical device of claim 22 wherein said waveguide is selected from the group consisting of circular cross-section waveguides, polygonal cross-section waveguides, tapered waveguides and combinations thereof.

32. The optical device of claim 22 further comprising an image source illuminated by the radiation collected and condensed at said waveguide, wherein said image resource contains a stored image and said stored image is projected by the radiation.

33. The optical device of claim 22 further comprising a fiber optic, the fiber optic being illuminated by the radiation collected and condensed at said waveguide, the fiber optic releasing the collected and condensed radiation to provide for illumination at a desired location.

34. An optical device for collecting electromagnetic radiation emitted by a single, non-cascaded source of electromagnetic radiation and focusing the collected radiation onto a target, said device comprising:

a first reflector comprising a portion of a revolution of a concave curve, said first reflector having an optical axis and at least two focal point on said optical axis, said first reflector producing rays of radiation reflected from said first reflector that converge at a second focal point of said first reflector when a source of electromagnetic radiation is located at a first focal point of said first reflector; and a second reflector comprising a portion of a revolution of a concave curve, said second reflector having an optical axis and at least two focal point on said optical axis, said second reflector being positioned and oriented with respect to said first reflector so that the optical axis of the first reflector and the optical axis of the second reflector are substantially collinear, said second reflector being positioned and oriented with respect to said first reflector so that the second focal point of the first reflector and a first focal point of the second reflector are positioned substantially proximate, and the converging rays of radiation reflected from said first reflector passing through the second focal point of the first reflector and being redirected by said second reflector toward the target positioned proximate the second focal point of said second reflector, wherein said single source of electromagnetic radiation is the only source of radiation in said device, and wherein said first reflector and said second reflector have substantially the same size and shape and are oriented optically symmetrically with respect to each other so that each ray of radiation reflected by a surface portion of said first reflector is reflected by a corresponding surface portion of said reflector toward said target so as to achieve substantially unit magnification between the source and the target.

35. An optical device for collecting electromagnetic radiation emitted by a source of electromagnetic radiation and focusing the collected radiation onto a target, said device comprising:

a first reflector comprising at least a portion of a revolution of a concave curve, said first reflector having an optical axis and at least two focal point on said optical axis, said first reflector producing rays of radiation reflected from said first reflector that converge at a second focal points of said first reflector when a source of electromagnetic radiation is located at a first focal point of said first reflector; and a second reflector comprising at least a portion of a revolution of a concave curve, said second reflector having an optical axis and at least two focal point on said optical axis, said second reflector being positioned and oriented with respect to said first reflector so that the optical axis of the first reflector and the optical axis of the second reflector are substantially collinear, said second reflector being positioned and oriented with respect to said first reflector so that the second focal point of the first reflector and a first focal point of the second reflector are positioned substantially proximate, and the converging rays of radiation reflected from said first reflector passing through the second focal point of the first reflector and being redirected by said second reflector toward the target positioned proximate the second focal point of said second reflector;

wherein each of said first and said second reflectors comprises at least a portion of a substantial ellipsoid of revolution, wherein each of said first and said second reflectors further comprises a non-ellipsoidal section.

36. An optical device for collecting electromagnetic radiation emitted by a single, non-cascaded source of electromagnetic radiation and focusing the collected radiation onto a target, said device comprising:

a first reflector comprising a portion of a revolution of a concave curve, said first reflector having an optical axis and at least two focal point on said optical axis, said first reflector producing rays of radiation reflected from said first reflector that converge at a second focal point of said first reflector when a source of electromagnetic radiation is located at a first focal point of said first reflector; and a second reflector comprising a portion of a revolution of a concave curve, said second reflector having an optical axis and at least two focal point on said optical axis, said second reflector being positioned and oriented with respect to said first reflector so that the optical axis of the first reflector and the optical axis of the second reflector are substantially collinear, said second reflector being positioned and oriented with respect to said first reflector so that the second focal point of the first reflector and a first focal point of the second reflector are positioned substantially proximate, and the converging rays of radiation reflected from said first reflector passing through the second focal point of the first reflector and being redirected by said second reflector toward the target positioned proximate the second focal point of said second reflector, wherein said single source of electromagnetic radiation is the only source of radiation in said device, and wherein said each of said first and said second reflectors comprises at least a portion of a substantial toroid of revolution.

37. An optical device for collecting electromagnetic radiation emitted by a source of electromagnetic radiation and focusing the collected radiation onto a target, said device comprising:

a first reflector comprising at least a portion of a revolution of a concave curve, said first reflector having an optical axis and at least two focal point on said optical axis, said first reflector producing rays of radiation reflected from said first reflector that converge at a second focal points of said first reflector when a source of electromagnetic radiation is located at a first focal point of said first reflector; and a second reflector comprising at least a portion of a revolution of a concave curve, said second reflector having an optical axis and at least two focal point on said optical axis, said second reflector being positioned and oriented with respect to said first reflector so that the optical axis of the first reflector and the optical axis of the second reflector are substantially collinear, said second reflector being positioned and oriented with respect to said first reflector so that the second focal point of the first reflector and a first focal point of the second reflector are positioned substantially proximate, and the converging rays of radiation reflected from said first reflector passing through the second focal point of the first reflector and being redirected by said second reflector toward the target positioned proximate the second focal point of said second reflector;

wherein said each of said first and said second reflectors comprises at least a portion of a substantial sphere of revolution.

38. A method for collecting electromagnetic radiation emitted by a single, non-cascaded source of electromagnetic radiation and focusing the collected radiation onto a waveguide, said method comprising the steps of:

positioning said source of electromagnetic radiation at a first focal point of a first ellipsoidal reflector comprising less than a complete concave surface of revolution so that said first reflector produces rays of radiation reflected from said first reflector that converge at a second focal point of said first reflector;

positioning a second ellipsoidal reflector comprising less than a complete concave surface of revolution so that a first focal point of the second ellipsoidal reflector is substantially proximate with the second focal point of the first ellipsoidal reflector, whereby the converging rays of radiation reflected from said first reflector pass through the first focal point of the first reflector and are redirected by said second reflector toward a second focal point of said second reflector; and positioning the waveguide proximate to the second focal point of said second reflector.

39. The method of claim 38 further comprising the step of orientating the first reflector and the second reflector so that an optical axis of the first reflector and an optical axis of the second reflector substantially coincide.

40. The method of claim 38 wherein said concave surface of said first reflector is configured such that unit magnification of said source does not occur at said second focal point of said first reflector.

* * * * *